(12) United States Patent
Caretta et al.

(10) Patent No.: US 7,131,475 B2
(45) Date of Patent: Nov. 7, 2006

(54) HIGH AND MEDIUM PERFORMANCE TIRE FOR VEHICLES

(75) Inventors: Renato Caretta, Gallarate (IT); Gianfranco Colombo, Concorezzo (IT); Stefano Gaiazzi, Quinzano di Sumirago (IT)

(73) Assignee: Pirelli Pneumatici S.p.A., Milan (IT)

( * ) Notice: Subject to any disclaimer, the term of this patent is extended or adjusted under 35 U.S.C. 154(b) by 198 days.

(21) Appl. No.: 10/148,597

(22) PCT Filed: Nov. 29, 2000

(86) PCT No.: PCT/EP00/11897

§ 371 (c)(1),
(2), (4) Date: Oct. 8, 2002

(87) PCT Pub. No.: WO01/39572

PCT Pub. Date: Jun. 7, 2001

(65) Prior Publication Data

US 2003/0111149 A1     Jun. 19, 2003

Related U.S. Application Data

(60) Provisional application No. 60/187,377, filed on Mar. 7, 2000.

(30) Foreign Application Priority Data

Dec. 1, 1999    (IT) .............................. M199A2516

(51) Int. Cl.
  *B60C 11/03*    (2006.01)
  *B60C 11/117*   (2006.01)

(52) U.S. Cl. ........................... 152/209.17; 152/209.18; 152/209.28; 152/903

(58) Field of Classification Search ............. 152/209.1, 152/209.17, 209.18, 209.28, 900, 901, 903, 152/209.6
See application file for complete search history.

(56) References Cited

U.S. PATENT DOCUMENTS 2,104,532 A * 1/1938 Sommer ................ 152/209.18

(Continued)

FOREIGN PATENT DOCUMENTS

IT    469844   *   3/1952

(Continued)

OTHER PUBLICATIONS

Ichiro, Nakajima, "Tire For Motor Bicycle" Patent Abstracts of Japan, JP 5310050 (Sep. 2, 1978).

(Continued)

*Primary Examiner*—Steven D. Maki
(74) *Attorney, Agent, or Firm*—Finnegan, Henderson, Farabow, Garrett & Dunner, L.L.P.

(57) ABSTRACT

A tire for a wheel of a vehicle includes a casing structure, a belt structure, and a tread band. A tread band pattern includes a central zone, two intermediate zones, and two shoulder zones. Each of the zones extends between planes that are substantially parallel to an equatorial plane of the tire. Each intermediate zone includes first and second sequences of pairs of transversal grooves. The first sequence pairs are alternated with the second sequence pairs. The grooves of the two sequences are inclined relative to each other. The first sequence grooves extend from first ends, at respective axially intermediate planes, to second ends, at predetermined first distances from selected second sequence grooves. The second sequence grooves extend from third ends, at respective axially inner planes, to fourth ends, at predetermined second distances from selected first sequence grooves. Intermediate zones include a zigzag rib. Shoulder zones include additional transversal grooves.

38 Claims, 4 Drawing Sheets

U.S. PATENT DOCUMENTS

| | | | |
|---|---|---|---|
| 2,272,879 A * | 2/1942 | Hargraves | 152/901 |
| 4,387,754 A | 6/1983 | Mirtain et al. | |
| 6,148,886 A * | 11/2000 | Takasugi et al. | 152/209.28 |
| 6,656,300 B1 * | 12/2003 | Cesarini et al. | 152/209.28 |
| 2003/0121580 A1 * | 7/2003 | Bello et al. | 152/209.18 |

FOREIGN PATENT DOCUMENTS

| | | | |
|---|---|---|---|
| JP | 07-251609 | | 10/1995 |
| JP | 7-251609 | * | 10/1995 |
| JP | 10-181314 | * | 7/1998 |
| WO | WO 98/25776 | | 6/1998 |
| WO | WO 99/16631 | | 4/1999 |

OTHER PUBLICATIONS

Yasuo, Himuro, "Pneumatic Tire", Patent Abstracts of Japan, JP 06055912 (Mar. 1, 1994).

Yutaka, Fukazawa, "Pneumatic Radial Tire", Patent Abstracts of Japan, JP 03099906 (Apr. 25, 1991).

* cited by examiner

HIGH AND MEDIUM PERFORMANCE TIRE FOR VEHICLES

CROSS-REFERENCE TO RELATED APPLICATIONS

This application is a national stage entry under 35 U.S.C. § 371 from International Application No. PCT/EP00/11897, filed Nov. 29, 2000, in the European Patent Office, the contents of which are relied upon and incorporated herein by reference; additionally, Applicants claim the right of priority under 35 U.S.C. § 119(a)–(d) based on patent application No. MI99A002516, filed Dec. 1, 1999, in the Italian Patent Office; further, Applicants claim the benefit under 35 U.S.C. § 119(e) based on prior-filed, provisional application No. 60/187,377, filed Mar. 7, 2000, in the U.S. Patent and Trademark Office.

BACKGROUND OF THE INVENTION

1. Field of the Invention

The invention relates to a high and medium performance tire for vehicles and, more particularly, to a tire having characteristics that are especially though not exclusively suitable for use on winding circuits and dry roads.

2. Description of the Related Art

A tire in its more general form comprises: a casing structure including a central crown portion and two axially opposite sides terminating in a pair of ribs for the attachment to the rim of a wheel; a belt structure coaxially associated with the casing structure and a tread band extended coaxially around the belt structure.

Generally the tread band comprises a raised pattern formed by a plurality of transversal and longitudinal grooves giving rise overall to a plurality of ribs distributed according to configurations of differing types, for example along a central zone straddling the equatorial plane and in at least two shoulder zones extending in positions coaxially opposite the central zone.

As the tire rolls, the ribs on the tread strip are subjected to a set of thermo-mechanical stresses, which are all the greater the more severe the conditions of use and which result in changes to their geometry and, over varying time periods, to a deterioration in the tire's performance.

In particular, the contact with the ground during running produces a flexing of the trailing edge of the ribs of the tire, said edge by drooping radially towards the inside and moving in the direction opposite the direction of running produces a restriction of the groove that separates it from the next rib. This phenomenon leaves the leading edge of the latter-named open to a tangential stress which is repeated cyclically at each revolution of the wheel, causing a typical uneven and premature wear known as "saw-tooth wear".

Tyres that try to minimize the number of ribs and strengthen their structure are known in the sector art.

For example, the patent application WO 98/25776 refers to a tire comprising a tread band provided with transversal grooves in three distinct zones, a central zone straddling the equatorial plane and two shoulder zones, so as to define a directional type tread profile, i.e. one having a preferential direction of rotation.

Each transversal groove comprises a first stretch extending within a shoulder zone according to a direction perpendicular to the equatorial plane and a second stretch extending obliquely inside the equatorial zone.

The transversal grooves are distributed circumferentially with a pitch "p" and extend alternatively from opposite shoulder zones.

More particularly, in the abovementioned tread band the transversal grooves are distributed in groups; and more specifically, the tread band comprises a first group of three grooves, parallel to one another, repeated circumferentially with a pitch "P" on the left of the equatorial plane and alternating with a second group of three grooves, parallel to one another, and repeated with an identical pitch "P" on the right of the equatorial plane.

In each group the grooves are of decreasing length in the direction of motion of the tire, such that one of the grooves passes through the equatorial plane whereas the remaining two grooves are terminated in the vicinity of the equatorial plane, at a different distance from the latter.

The configuration of the transversal grooves is such as to produce, in the space between the alternating groups, a central rib extending circumferentially in continuously zigzag fashion and a plurality of transversal blocks that leave from the central rib and stretch obliquely right and left of the equatorial plane in the direction opposite that of rolling of the tire.

The state of the art has not fully solved the problem of producing a tire provided with a tread pattern that may regardlessly be of the symmetrical, asymmetrical or directional type and at the same time be capable of minimizing and rendering even the wear of the tread band while the tire is rolling, and of improving and rendering uniform the longitudinal and transversal rigidity so as to ensure an effective stability both on the straight and in bends on dry roads, all of which without impairing the characteristics of low rolling resistance, of sufficiently quiet operation and of good driveability including on terrains that are not dry, for example on roads that are wet or covered in snow.

The tire described in patent WO 98/25776 has transversal grooves extending with continuity and great density from the shoulder zones to the zone straddling the equatorial plane, thereby giving rise to a plurality of narrow and elongated blocks, arranged obliquely to the equatorial plane and excessively deformable. In this way, uneven wear may occur of the elastomeric material delimiting these grooves, particularly under conditions where the tire is rolling on a straight, dry road or at any rate under conditions where the stresses acting along the equatorial plane are considerably greater than those acting in a direction perpendicular to this plane.

SUMMARY OF THE INVENTION

The Applicant has observed that a better solution to the problem outlined above could be achieved by having recourse to a tread band substantially free of blocks and divided into at least five zones: a central zone straddling the equatorial plane, two intermediate zones disposed to the sides of the central zone and two shoulder zones, arranged in a position axially external to said two intermediate zones.

The Applicant has found that a preferred solution consists in providing each intermediate zone, at a predetermined distance from the equatorial zone, with a plurality of transversal grooves, arranged in groups axially opposite each other and at a reciprocal predetermined distance, in such a way that in the space between said grooves a circumferential, continuous rib is defined having a typically zigzag configuration.

The Applicant has further noted that the solution found may be optimized by giving to the central zone of the tread band particular geometric characteristics not present in the other zones (intermediate and/or shoulder) and/or at any rate a pattern different from that of the intermediate and/or shoulder zones in such a way as to obtain an effect of synergy suitable to improve or supplement the performances offered by the patterns of those zones.

In addition, the Applicant has found particular advantage in the differentiating of the density of the transversal grooves possessed by the shoulder zones and by the intermediate zones adjacent thereto, in such a way as to distribute the grooves of the intermediate zones according to a module repeated circumferentially with a pitch different from that with which said grooves are distributed in the shoulder zones.

In a first aspect, the invention relates to a tire for vehicles comprising:
  a casing structure including a central crown portion and two axially opposite sides terminating in a pair of ribs for the attachment of said tire to a corresponding rim of a wheel;
  a belt structure coaxially associated with said casing structure;
  a tread band, extended coaxially around said belt structure, moulded with a relief pattern comprising:
  a central zone (E), straddling the equatorial plane (Y-Y) of said tire and extending between two central planes (a-a) substantially parallel to said equatorial plane;
  two intermediate zones (F), each of which extending between one side of said central zone (E) and an intermediate plane (b-b) substantially parallel to said equatorial plane (Y-Y);
  two shoulder zones (G), each of which extending between the axially outermost side of one of said intermediate zones (F) and an axially external plane (c-c), substantially parallel to said equatorial plane (Y-Y) and located in correspondence with the side edge of said tread band, said intermediate (F) and shoulder (G) zones comprising a plurality of transversal grooves,
  characterized in that each intermediate zone (F) comprises two sequences of pairs of transversal grooves, first and second sequence respectively, the pairs of said first sequence being consecutively alternated over the entire circumferential length of the tire with the pairs of said second sequence, each pair comprising two distinct grooves at least partly parallel, the grooves of each pair of said first sequence being inclined at a predetermined angle α to the grooves of each pair of said second sequence, said grooves of said first sequence departing from axially opposite ends of said intermediate zones and terminating with ends inside the latter with respect to the grooves of said second sequence, said internal ends of a pair of a given sequence being at a predetermined distance from the groove of the pair of the other sequence nearest to said ends, said predetermined distance giving rise circumferentially to a continuous, zigzagging rib from which continuous oblique portions, each delimited by the grooves of one of said pairs, depart alternatively from opposite ends.

Each intermediate zone advantageously comprises a continuous, zigzagging rib and a plurality of continuous, i.e. full, portions of elastomeric material which leave transversally from both sides of each zigzagging rib. These characteristics in each intermediate zone produce a structure that is resistant in both the longitudinal and transversal direction, capable of reacting elastically to the stresses acting on the tread band during rolling of the tire.

It must be pointed out in particular that the reciprocal configuration of the two sequences of transversal grooves means that it is possible to move from one end of each intermediate zone to the other (i.e. from the a-a plane to the b-b plane, or vice versa) without intersecting any groove. Accordingly ample transversal zones are obtained in said intermediate zones that confer undeformability characteristics on the tread band that are particularly favourable for resisting the stresses acting in a bend when the tire is rolling.

In a preferred embodiment of the invention, each pair of grooves has one groove that is longer than the other. Therefore, for the sake of simplicity in the remainder of this description, where reference is made to the abovementioned preferred embodiment, the transversal grooves of each pair shall be indicated as long groove and short groove. In addition, the two ends of each transversal groove shall be indicated respectively as the terminal end and the starting end, both when referring to a groove in position inside the intermediate zone and when considering an opposite groove.

Preferably the terminal ends of the long grooves of a pair of grooves belonging to a given sequence are aligned with the terminal ends of the short grooves of a consecutive pair of grooves belonging to the other sequence, and vice versa.

Still more preferably, the pairs of grooves belonging to a given sequence comprise blind grooves.

Here and in the remainder of the description, and in the accompanying claims as well, the term "blind groove" means a groove surrounded by continuous walls without any way in and/or out of the groove in question.

Preferably the grooves of said sequence of pairs are of like shape and, still more preferably, said shape is elliptical.

The transversal grooves of the intermediate zones and the adjacent ones possessed by the shoulder zones may or may not be staggered with respect to each other.

In a preferred embodiment the pairs of transversal grooves of the sequence nearest to the shoulder zone, adjacent to the intermediate zone to which said pairs belong, are joined consecutively to the transversal grooves possessed by said shoulder zone.

According to a particularly preferred embodiment, in view of its being able to confer advantageous qualities of tractability on the tire of the invention, the shoulder transversal grooves are arranged perpendicularly to the equatorial plane of the tire.

Still more preferably, the succession of a pair of transversal grooves respectively of the first and of the second sequence gives rise in the intermediate zone to a module that is repeated circumferentially with a pitch twice the pitch of the transversal grooves found in the shoulder zone.

Advantageously the difference between said pitches (namely between the pitch of the shoulder zones and the pitch of the intermediate zones) creates a discontinuity of the edges of the tread along the footprint area which, to its greater advantage, improves noiselessness of the tire.

Preferably, the central zone of the tread band straddling the equatorial plane comprises two circumferential grooves delimiting therein a central rib. Alternatively said central zone comprises a single circumferential groove, preferably of the rectilinear type.

Advantageously said one or more central grooves promote the draining of water during rolling of the tire on wet roads avoiding the formation of a film of water between tire and road.

In a second aspect, the invention relates to a premoulded tread band for the re-moulding of worn tires comprising:
  a central zone (E), straddling the equatorial plane (Y-Y) of said tire and extending between two central planes (a-a) substantially parallel to said equatorial plane;

two intermediate zones (F), each of which extending between one side of said central zone (E) and an intermediate plane (b-b) substantially parallel to said equatorial plane (Y-Y);

two shoulder zones (G), each of which extending between the axially outermost side of one of said intermediate zones (F) and an axially external plane (c-c), substantially parallel to said equatorial plane (Y-Y) and located in correspondence with the side edge of said tread band, said intermediate (F) and shoulder (G) zones comprising a plurality of transversal grooves, characterized in that each intermediate zone (F) comprises two sequences of pairs of transversal grooves, first and second sequence respectively, the pairs of said first sequence being consecutively alternated over the entire circumferential length of the tire with the pairs of said second sequence, each pair being made of two distinct grooves at least partly parallel, the grooves of each pair of said first sequence being inclined at a predetermined angle α to the grooves of each pair of said second sequence, said grooves of said first sequence departing from axially opposite ends of said intermediate zones and terminating with ends inside the latter with respect to the grooves of said second sequence, said internal ends of a pair of a given sequence being at a predetermined distance from the groove of the pair of the other sequence nearest to said ends, said predetermined distance giving rise circumferentially to a continuous, zig-zagging rib from which continuous oblique portions, each delimited by the grooves of one of said pairs, depart alternatively from opposite ends.

Preferably the transversal grooves of said intermediate zones have an elliptical configuration; still more preferably, the greater axes of said ellipses together form a predetermined angle α of between 80° and 100°.

In a preferred embodiment, the greater axes of the ellipses corresponding to the transversal grooves of the pairs of grooves of said first sequence form an angle γ of between 35° and 55° with respect to a plane parallel to the equatorial plane Y-Y.

Preferably the grooves of each pair are of different lengths and each of the terminal ends of the grooves of a pair of said sequence is aligned with a like number of terminal ends of the grooves of an axially opposite pair of the other sequence. More particularly, the terminal ends of the longer grooves of the first sequence are aligned with the terminal ends of the shorter grooves axially opposite, that is to say belonging to the second sequence and, by the same token, the terminal ends of the shorter grooves of the first sequence are aligned with the terminal ends of the longer grooves belonging to the second sequence.

Conveniently the tread band is characterized in that all the transversal grooves with starting ends near the central zone are blind.

Preferably the tread band according to the invention has a ratio between the width of the central zone and the width (W) of the tread band that is between 0.10 and 0.20 and a ratio between the width of an intermediate zone ($L_0$) and the width of the same tread band of between 0.17 and 0.30.

Preferably the two intermediate zones are of equal width.

In another preferred embodiment of the invention, each intermediate zone of the tread band has a full/empty ratio that is between 0.75 and 0.90.

BRIEF DESCRIPTION OF THE DRAWINGS

Further characteristics and advantages will become apparent from the description that follows of a preferred embodiment of a tire according to this invention, provided purely by way of an illustrative, non-restrictive example, and with reference to the accompanying drawings, where.

DETAILED DESCRIPTION OF THE PREFERRED EMBODIMENTS

Figure 1:
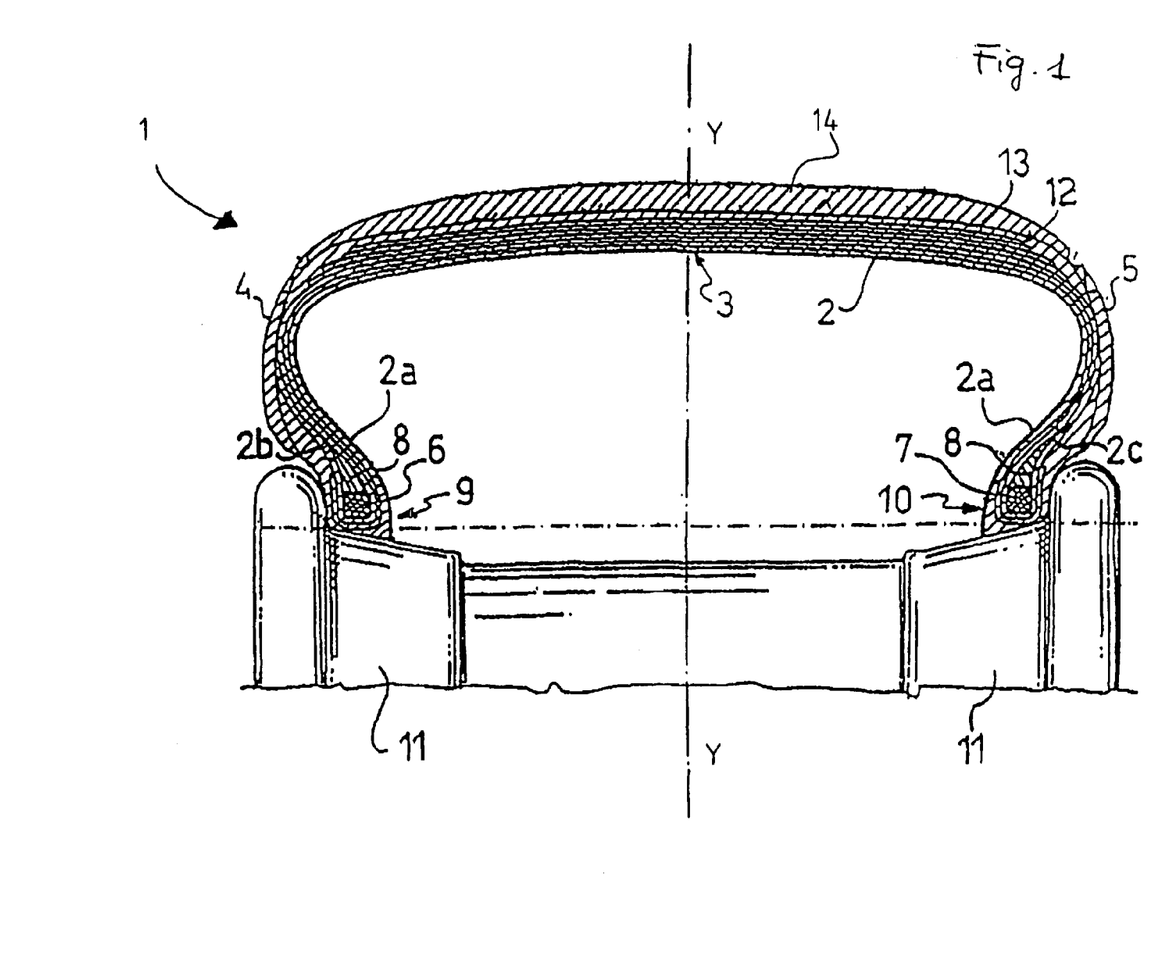
FIG. 1 is a transverse sectional view of a tire according to the invention, in particular of a tire intended to be fitted on the front wheel of a vehicle.
Figure 2:
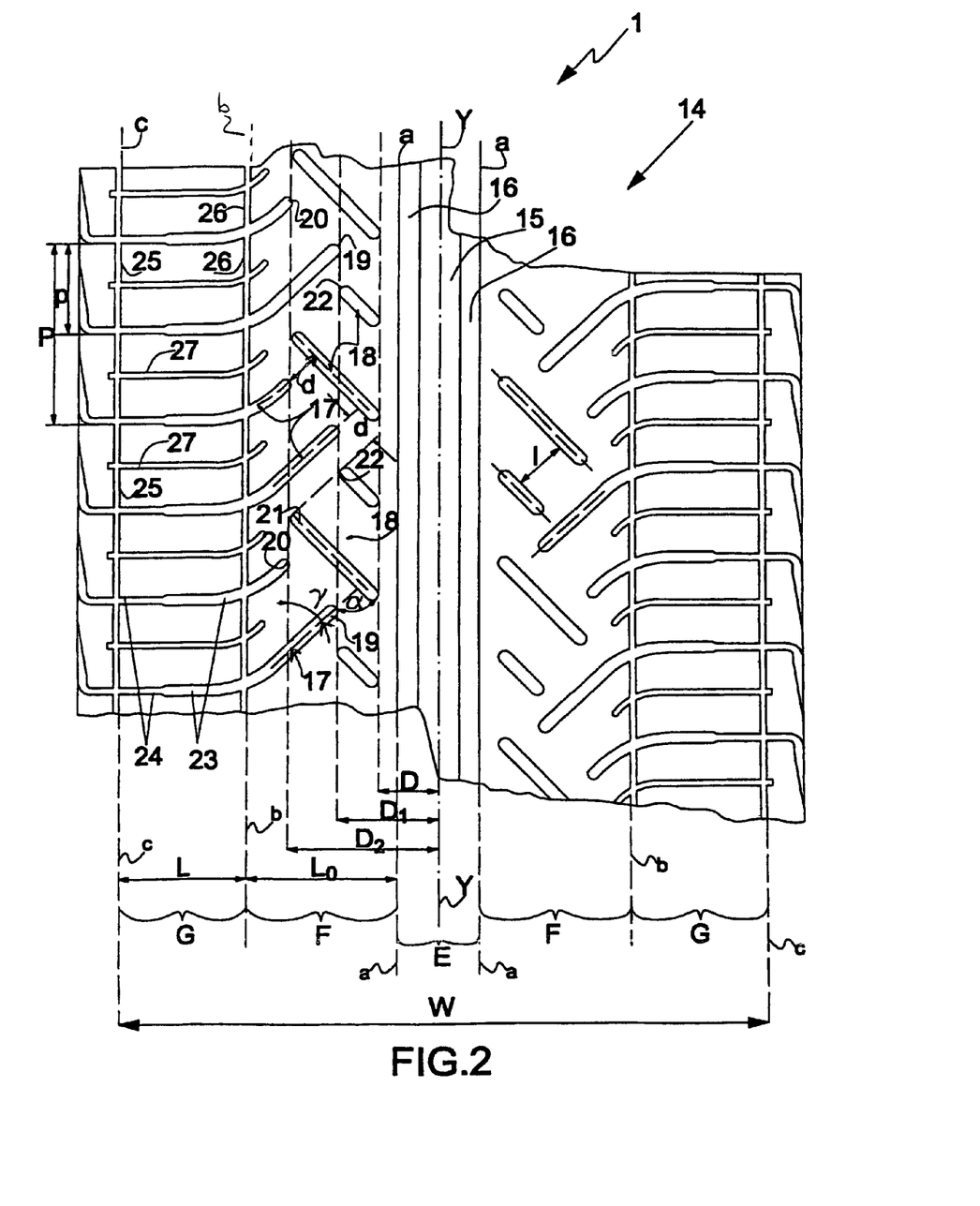
FIG. 2 is a partial development in plan view of the tread band of the tire of FIG. 1.

With reference to FIGS. 1 and 2, a high performance tire for vehicles is generically indicated with the numeral 1, in particular a tire intended to be fitted on the front axle of a motor vehicle.

The tire 1 comprises a casing structure 2, including a central crown portion 3 and two sides 4, 5, said casing structure being provided with a reinforcing ply 2a the opposite ends of which 2b, 2c are wound around corresponding rings 6, 7.

An elastomeric filler 8, occupying the space defined between the reinforcing ply 2a and the corresponding ends 2b, 2c of the reinforcing ply 2a, is applied to the radially external perimeter edge of the rings 6, 7, arranged in correspondence with the radially internal ends of said sides 4, 5.

As is known, the opposite zones of the tire 1, each comprising a ring 6, 7 and the filler 8, form the so-called ribs, globally indicated with the numerals 9 and 10, adapted for the attachment of the tire 1 to a corresponding mounting rim 11 of the wheel of a vehicle.

Coaxially associated with the abovementioned casing structure 2 is a belt structure 12 comprising one or more reinforcing strips 13, made from textile or metallic cords coated in a given compound.

A tread band 14, into the thickness of which a pattern illustrated in greater detail in FIG. 2 has been impressed, is applied in a known way on the belt structure 12.

Hereinbelow, for simplicity of the description, only that part of the tread band 14 of FIG. 2 disposed on the left of the equatorial plane Y-Y shall be detailed, as the side located on the right of said plane is identical after being turned over by 180° and being subsequently staggered by a predetermined amount in the circumferential direction.

The tread band 14 is subdivided into a plurality of zones, more precisely:

a central zone E straddling the equatorial plane Y-Y and included between two central planes a-a, substantially parallel to the equatorial plane Y-Y, two intermediate zones F, each of which extending between one side of the zone E, namely between a plane a-a, and an intermediate plane b-b substantially parallel to said equatorial plane Y-Y, two shoulder zones G each of which delimited between one side of the intermediate zone F, namely between a plane b-b, and an axially external plane c-c substantially parallel to said equatorial plane Y-Y and located in correspondence with the side edge of said tread band.

In the embodiment illustrated, the central zone E comprises a central rib 15 with width between 12 and 20 mm and two longitudinal grooves 16 disposed respectively on either side of said rib 15.

To advantage, the rib 15 confers on the tire 1 a suitable longitudinal stability during rolling and the two longitudinal grooves 16 promote the expulsion of water under conditions of travelling on wet roads.

The central zone E straddles the equatorial plane Y-Y for a stretch equal to at least 10% of the axial width W of the tread band 14, measured between the planes c-c disposed in correspondence with the lateral edges of said tread band.

It must be pointed out that the quoted conformation of the central zone E must not be understood in any restrictive sense for the invention, it in fact constituting one example of the various embodiments.

In the intermediate zones F, the tread band 14 comprises a plurality of transversal grooves, preferably of elongated elliptical shape, according to a configuration comprising two sequences of pairs of grooves repeated circumferentially.

In greater detail, each intermediate zone F comprises a first sequence of pairs of grooves 17 and a second sequence of pairs of grooves 18 consecutively arranged along the circumferential direction, said second sequence being axially opposite said first sequence along all of the circumferential development.

In the embodiment shown in FIG. 2, each pair of said sequences is made from two distinct grooves, a long one and a short one, at least partly parallel. In addition, the grooves of said second pairs 18 are of the blind type.

Conveniently, as illustrated in FIG. 2, in each pair 17, 18, the longitudinal axis of the short groove has a length that is between 30% and 70% of the length of the long groove. Furthermore the distance "1" between the long groove and the short groove of each pair is between 15 mm and 40 mm, said distance being measured perpendicularly to the longitudinal axis of each groove.

The grooves of the pair 17, in relation to the direction of the equatorial plane Y-Y, form an angle γ of between 35° and 55°. In addition the longitudinal axes of the grooves of the pairs 17 of the first sequence, together with the longitudinal axis of the groove of the pair 18 closest to the groove of said pairs 17, form a predetermined angle α of between 80° and 100°. Preferably α is of 90°.

More specifically, all the transversal grooves of the pairs 17 of the first sequence start from the axial planes b-b of separation from the shoulder zones G and terminate with ends 19, 20 at a distance "d" from the longitudinal axis of the respective long grooves of the pairs 18 of the second sequence.

In turn, all the transversal grooves of the pairs 18 of the second sequence start from ends of the intermediate zone F axially opposite the pairs 17 of the first sequence and terminate with ends 21, 22 at distance "d" from the longitudinal axis of the respective long grooves of the pairs 17 of the first sequence. Conveniently the distance "d" is between 5 mm and 25 mm.

The starting ends of the grooves of the pairs 18 are aligned on one and the same plane, the distance "D" of which from the equatorial plane Y-Y is between 14 mm and 32 mm.

In the example illustrated in FIG. 2, all the terminal ends 19, 20, 21, 22 of the grooves of the first 17 and second 18 pairs are aligned on two distinct planes substantially parallel to the equatorial plane Y-Y, and more precisely:

all the ends 19 of the long grooves of the pairs 17 and all the ends 22 of the short grooves of the second pairs 18 are aligned on one and the same plane, the distance $D_1$ of which from the equatorial plane Y-Y is between 22 mm and 82 mm;

all the ends 20 of the short grooves of the first pairs 17 and all the ends 21 of the long grooves of the pairs 18 are aligned on one and the same plane, the distance $D_2$ of which from the equatorial plane Y-Y is between 30 mm and 95 mm;

Conveniently all the transversal grooves of said pairs 17, 18 have a width of between 3.5 mm and 10 mm and a maximum depth of between 5 mm and 10 mm.

The tread band 14 comprises further transversal grooves in the shoulder zones G, each of said grooves comprising at least one rectilinear stretch 24 which, with respect to the equatorial plane Y-Y, forms an angle not less than 85° and preferably of 90°.

More in detail, each shoulder transversal groove is formed from two stretches 23 and 24, the first (23) approximately 8 mm wide and between 5 mm and 10 mm deep and the second (24) approximately 4 mm wide and between 1 mm and 6 mm deep. Moreover the ratio between the lengths of said two stretches 23, 24 is between 30% and 50%.

It was found to advantage that the reduced width of the shoulder groove 23, 24 (in moving from the stretch 24 to stretch 23 in the axial direction when approaching the equatorial plane Y-Y), entailing an increase in the "full" area in the shoulder zone, contributes to improving the roadholding in bends of the tire according to the invention.

In the embodiment illustrated in FIG. 2, the stretches 23 of the shoulder grooves are joined by a curving stretch to the abovementioned transversal stretches of the pairs 17 of the first sequence belonging to the intermediate zone F. Preferably, this joining stretch is an arc of a circle with radius between 30 mm and 60 mm.

As shown in FIG. 2, the pattern of the tread band 14 in the shoulder zones G is discerned mainly from a plurality of transversal grooves 23, 24 repeated circumferentially with a pitch "p". Similarly, the abovementioned joining sections, which join the grooves of the shoulder zones G and the transversal grooves of the pairs 17 of the intermediate zones F, are repeated circumferentially with a like pitch "p".

The pattern of the intermediate zones F, as stated, is discerned from pairs of transversal grooves 17, 18, which alternate along the circumferential direction giving rise to a module which is repeated along the circumferential development of the tread band with a pitch "P" different from the pitch "p" of the shoulder transversal grooves. In the preferred embodiment illustrated in FIG. 2, the pitch "P" has a value substantially twice that of the pitch "p". For the sake of simplicity, a tread band having a single pitch "p" has been described, but it will be obvious that the above also applies for tread bands with a pitch "p" circumferentially variable according to a predetermined law, for example, with alternations of pitches "p" of two different lengths, respectively a long pitch and a short pitch.

The preferred embodiments of this invention envisage pitches "p" of between 25 mm and 50 mm when the circumferential development of the tire, measured along the equatorial plane at the outermost point of the tread band, is between 1750 mm and 2200 mm.

Conveniently in each shoulder zone G the tread band 14 of the tire 1 comprises a longitudinal notch 25, also called "disconnection notch" and a longitudinal incision 26.

The notch 25 and the incision 26 are extended circumferentially in a direction substantially perpendicular to the shoulder transversal grooves 23, 24.

The longitudinal notch 25 has a depth of about 2 mm and a width of about 3 mm, whereas the longitudinal incision 26 has a width of about 1.5 mm and a depth of between 3 mm and 7 mm.

Said incisions and notches advantageously improve handling on the wet.

Conveniently in each shoulder zone G the tire 1 also comprises a plurality of transversal notches 27 placed between two consecutive shoulder transversal grooves 23,24.

These notches 27 have a depth of approximately 4 mm and a width of approximately 3 mm and extend axially along a section between the longitudinal notch 25 and the longitudinal incision 26.

The use of these notches contributes advantageously to reducing noise of the tire.

Figure 3:
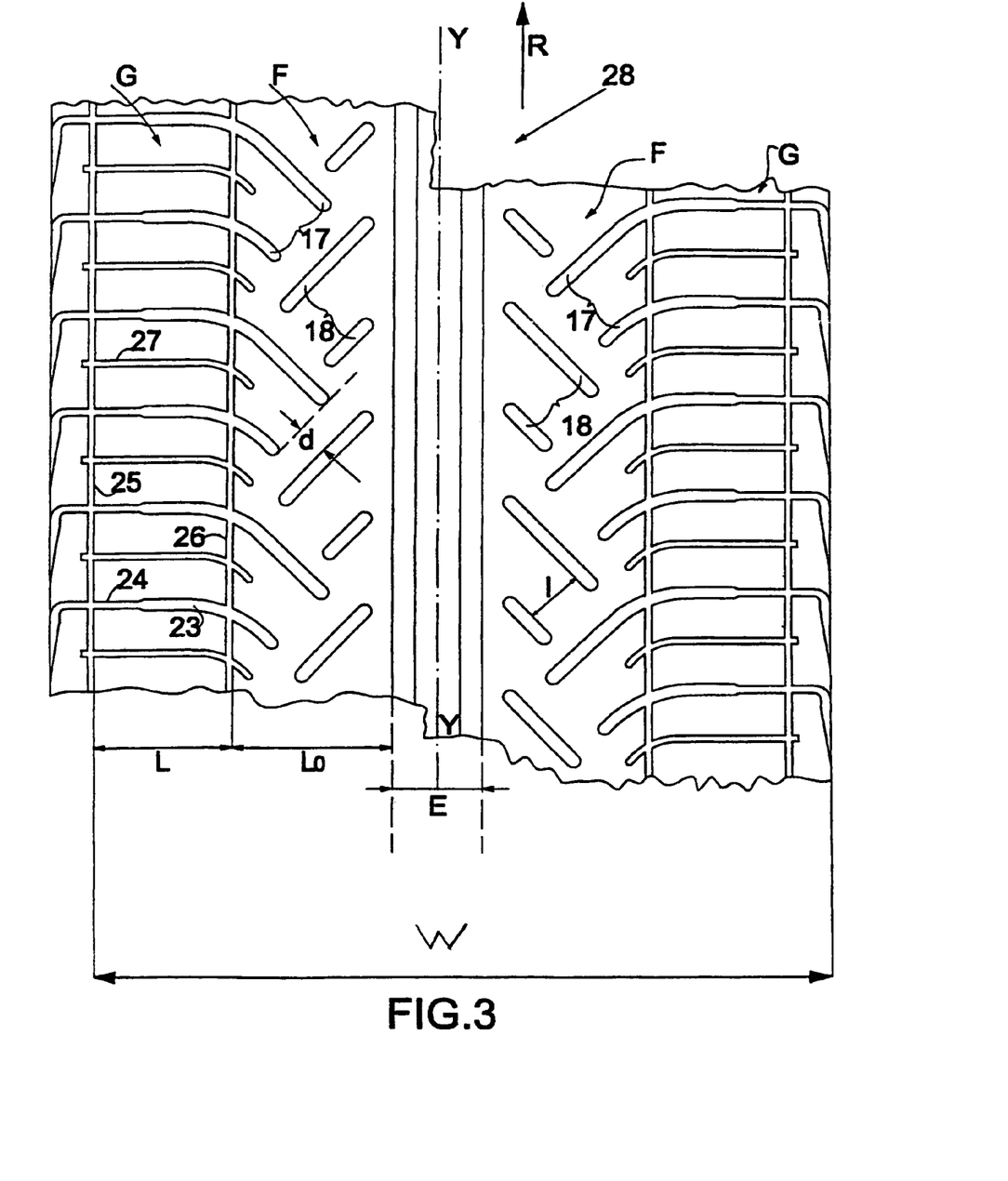
FIG. 3 is a partial development in plan view of a tread band according to a further embodiment of the tire of the invention.

A further embodiment of the invention is illustrated in FIG. 3 concerning a particular tire 28 of the directional type, that is to say provided with an overall pattern having a predetermined direction of rolling (indicated with the arrow R in FIG. 3) and two intermediate F and shoulder G zones of the tread band, located at the sides of the equatorial plane Y-Y, which are repeated specularly on either side of said equatorial plane. The two halves of the tread band 14 comprise the same pattern characteristics as described previously, therefore the elements of the tire 28 structurally or functionally the same as those already illustrated with reference to the tire 1 shown in FIGS. 1 and 2 will be indicated using the same reference numerals and will not be described any further.

As may be seen in the embodiment illustrated in FIG. 3, the intermediate F and shoulder G zones of the tread band 14, as well as being specular with respect to the equatorial plane Y-Y, are also staggered in the circumferential direction by an amount equal to approximately 50% of the pitch "p" of the shoulder transversal grooves.

The width of each shoulder zone G having been defined with L and the width of the tread band measured between the planes c-c with W, the preferred embodiments of the tire according to this invention envisage a ratio L/W of preferably between 0.10 and 0.28.

These preferential values for said ratio, as indeed also the ranges cited above for the dimensional quantities described, are valid for tires having measurements 185/60R14 or 225/50R16 or 255/45R18.

With this invention a plurality of advantages may be attained.

A first advantage consists, for example, in the fact that by having defined a system of transversal grooves which never intersect in the two intermediate zones F, the tread band is endowed with a considerable ability of reaction in relation to the external stress forces.

Figure 4:
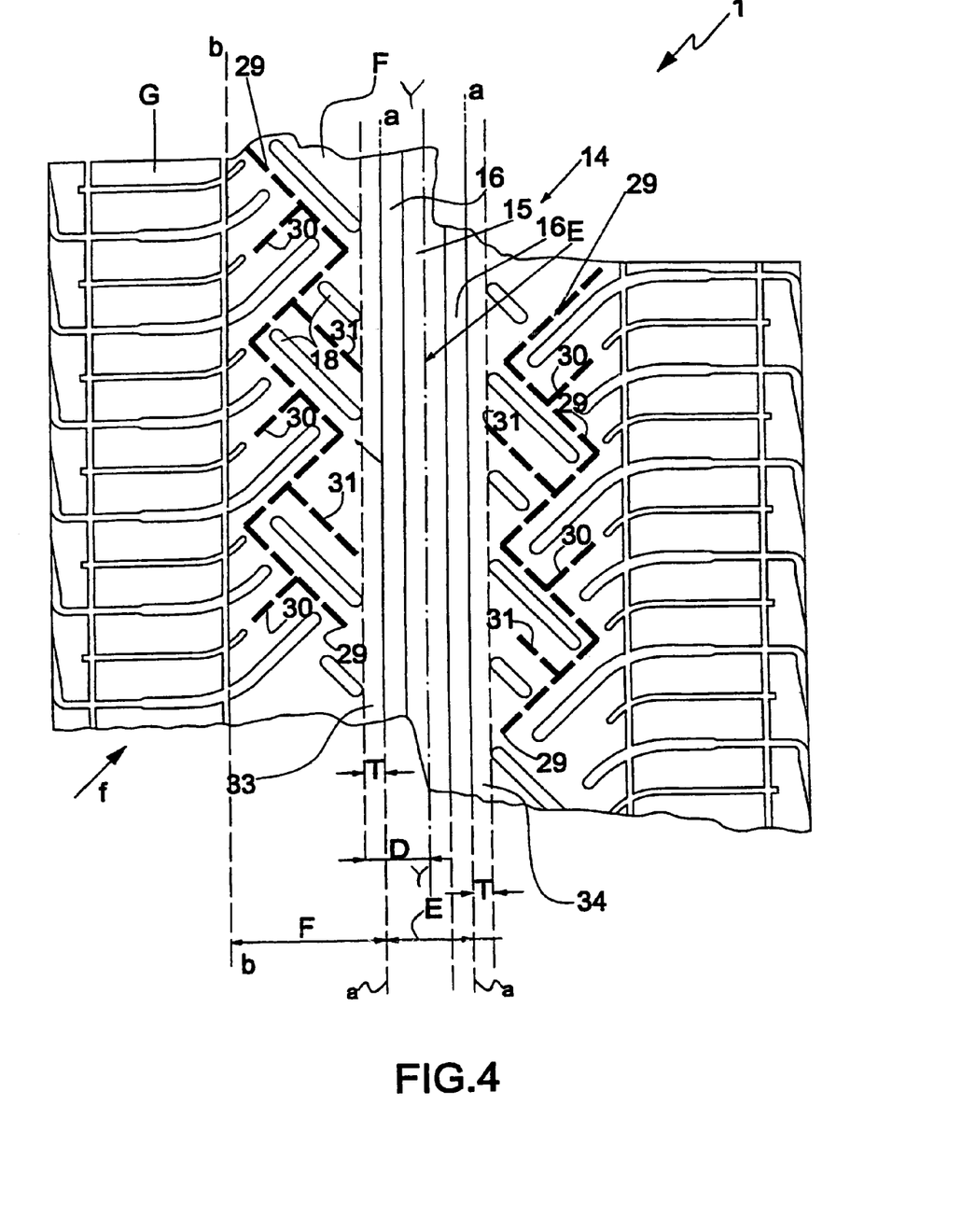
FIG. 4 illustrates some details of the partial plan view of FIG. 2.

In order to better clarify this aspect, reference is now made to a tread band 14 of the tire 1 illustrated in FIG. 4, perfectly equal to FIG. 2 except for a few additional references included by way of explanation of the above.

The intermediate zones F of the tread band 1 comprise a particular pattern the geometrical characteristics of which depend, among other things, on the distance "l" between the two grooves of a same pair (17, 18), on the particular conformation of the space between the two grooves of a same pair, on the distance "d" between the two pairs of transversal grooves 17, 18 distributed in a pitch "P", and on the orientation of all the pairs among themselves and in relation to the equatorial plane Y-Y. These characteristics result in the formation, in each intermediate zone F, of a rib extending in zigzag fashion for the entire circumferential development and a plurality of continuous portions of elastomeric material which depart obliquely from both sides of said zigzagging rib.

This configuration is represented schematically in FIG. 4 wherein, for greater clarity, both the circumferential zigzag rib 29 and the oblique portions 30, 31 departing therefrom are depicted in dashed lines.

The two zigzag ribs 29 and the oblique portions 30, 31 are formed from continuous parts of elastomeric material allowing them to oppose the stresses exerted by the ground on the tire during rolling.

Having said all this, it is known that under conditions of rolling in a bend a tire is subject to stresses resulting from the vectorial composition of a force acting in the direction of running and a force perpendicular to the equatorial plane needed to equilibrate the centrifugal force.

The resulting stresses have a direction on the tire depending both on the resistance characteristics of the compound used in the tread band and on the prevalence of one of the two forces directed in the running direction or in the transversal direction.

In accordance with the invention, the plurality of oblique portions 30, 31 disposed as illustrated in FIG. 4 constitute "struts" suitable for discharging the quoted resultant stresses along their axes. Besides, as the oblique portions are connected to the zigzagging ribs 29, these ribs, with their resistance, will also contribute to elastically balancing the stresses acting on the tire.

In particular, in the case where the resultant of the stresses is directed in the direction of the arrow "f" in FIG. 4, the active struts will be those relative to the plurality of portions 30 also oriented in the direction of said resultant inside the two intermediate zones F.

As a result of this ability to elastically resist the transversal forces, the tire according to the invention is favourably suitable for use on winding circuits.

In addition, as can be seen from FIG. 4, from each stretch of the dashed line constituting the circumferential zigzag rib 29, firstly an oblique portion 30 and then an oblique portion 31 alternately depart in a direction substantially perpendicular to the portion 30, so that the two portions, substantially of equal dimensions, confer a substantially uniform rigidity both in the transverse and in the longitudinal direction on each intermediate zone F.

Advantageously the uniform rigidity of the two intermediate zones F, together with the absence of isolated blocks, contributes greatly to minimizing the phenomena of tread band wear and to rendering said phenomena even so as to avoid uneven wear of said band.

A further advantage of the tire according to the invention consists of the fact that, thanks to the alternating distribution of the pairs of transversal grooves of the first and second sequence belonging to said intermediate zones and the great density of the transversal grooves in the shoulder zones, the number of transversal grooves present in the footprint area during the rolling of the tire is maintained advantageously constant. This aspect signifies the optimization of the distribution of the pressures in the footprint area during rolling of the tire.

A further advantage of this invention consists of the fact that the pattern of the tread band has a high of full/empty ratio.

In fact, as may be seen in FIG. 4, the high full/empty ratio is determined not only by the presence of the continuous zigzagging ribs of elastomeric material 29 and of the oblique portions 30, 31 which depart obliquely therefrom, but also by the presence of longitudinal ribs 33, 34 included between the starting ends of the grooves of the pairs 18 of the second sequence of the intermediate zones F and the planes a-a of separation of the intermediate zones F from the central zone E.

Preferably the width "T" of the ribs 33, 34 is between 3 mm and 21 mm.

The presence of the continuous ribs 33, 34 ensures that the portion of intermediate zone F closest to the central zone E has a greater rigidity than that possessed by the remainder of the intermediate zone F adjacent to the shoulder zone G.

Furthermore, the high full/empty ratio with values between 0.65 and 0.85 entails low values of the specific pressures in the footprint area and low deformability of the tread band in this area with resultant advantageous attenuation of the noise of the tire of the invention.

In particular, the tire according to the invention, having transversal grooves in the intermediate zones F mutually isolated and separated from the equatorial plane Y-Y through the central zone E has lesser deformability than tires not provided with transversal grooves running from the shoulder zones up to near the equatorial plane, and sometimes beyond. Therefore, thanks to a tread band of greater mass than the known tires, this tire is advantageously endowed not only with less noise, but also with less resistance to rolling.

Yet another advantage of this invention consists of the excellent driving performances obtainable also on roads covered in snow. In fact, according to one of the preferred embodiments according to the invention described in the foregoing, said tire comprises a tread band provided in the intermediate zones with a plurality of blind transversal grooves capable of capturing and retaining the snow, substituting the rubber-snow friction with a snow-snow friction, the latter as is known being much greater than the former.

Those acquainted with the sector art, having understood the invention as described above, will now also be able to effect all those choices, variants and modifications of the variables associated with this invention needed to solve the specific technical problem that they have tackled, namely to give precedence to a specific behavioural aspect (for example, the performance in miles with respect to noise, by increasing the depth of the inclined grooves, or the tractability with respect to wear, by increasing the depth and/or width of the transversal grooves, etc.) in relation to the severity of operation in the particular application of the vehicle that it is intended to equip with the tires of the invention.

The invention claimed is:

1. A tire for a wheel of a vehicle, comprising:
a casing structure;
a belt structure; and
a tread band;
wherein the casing structure comprises a central crown portion and two axially opposite sides terminating in ribs for attaching the tire to a corresponding rim of the wheel,
wherein the belt structure is coaxially associated with the casing structure,
wherein the tread band extends coaxially around the belt structure,
wherein the tread band comprises a pattern, comprising:
a central zone;
two intermediate zones; and
two shoulder zones;
wherein each of the zones extends between planes that are substantially parallel to an equatorial plane of the tire,
wherein the planes comprise two axially inner planes, two axially intermediate planes, and two axially outer planes,
wherein the axially outer planes correspond to side edges of the tread band,
wherein the central zone straddles the equatorial plane of the tire,
wherein the central zone extends between the two axially inner planes,
wherein each intermediate zone extends between one of the axially inner planes and a corresponding axially intermediate plane,
wherein each shoulder zone extends between one of the axially intermediate planes and a corresponding axially outer plane,
wherein each intermediate zone comprises first and second sequences of pairs of transversal grooves,
wherein the pairs of transversal grooves of the first sequence are consecutively alternated with the pairs of transversal grooves of the second sequence over a circumferential length of the tire,
wherein each pair of transversal grooves of the first sequence comprises two distinct grooves at least partly parallel to each other,
wherein each pair of transversal grooves of the second sequence comprises two distinct grooves at least partly parallel to each other,
wherein the transversal grooves of the first sequence are inclined at a predetermined first angle relative to the transversal grooves of the second sequence,
wherein the transversal grooves of the first sequence extend from first ends, at respective axially intermediate planes, to second ends, at predetermined first distances from selected transversal grooves of the second sequence,
wherein the transversal grooves of the second sequence extend from third ends, at respective additional planes between the axially inner planes and the axially intermediate planes, to fourth ends, at predetermined second distances from selected transversal grooves of the first sequence,
wherein the additional planes are substantially parallel to the equatorial plane of the tire,
wherein each intermediate zone further comprises a circumferentially continuous, zigzag rib extending between respective axially inner and axially intermediate planes,
wherein the shoulder zones comprise additional transversal grooves, and
wherein a circumferential groove at each of the axially inner planes extends in a direction substantially parallel to the equatorial plane of the tire.

2. The tire of claim 1, wherein the additional planes are located between 14 mm and 32 mm from the equatorial plane of the tire.

3. The tire of claim 1, wherein the transversal grooves of the first sequence are delimited lengthwise by substantially rectilinear walls, and
wherein the transversal grooves of the second sequence are delimited lengthwise by substantially rectilinear walls.

4. The tire of claim 1, wherein a value of the predetermined first angle is between 80° and 100°.

5. The tire of claim 1, wherein the transversal grooves of the first sequence form, relative to a plane parallel to the equatorial plane of the tire, a second angle between 35° and 55°.

6. The tire of claim 1, wherein each pair of transversal grooves of the first sequence comprises one short groove and one long groove, and wherein each pair of transversal grooves of the second sequence comprises one short groove and one long groove.

7. The tire of claim 6, wherein the short groove of each pair of transversal grooves of the first sequence comprises a length between 30% and 70% of a length of the corresponding long groove, and wherein the short groove of each pair of transversal grooves of the second sequence comprises a length between 30% and 70% of a length of the corresponding long groove.

8. The tire of claim 6, wherein the second ends of the long grooves are circumferentially aligned with the fourth ends of the short grooves, and wherein the fourth ends of the long grooves are circumferentially aligned with the second ends of the short grooves.

9. The tire of claim 6, wherein the second ends of the long grooves are circumferentially aligned with the fourth ends of the short grooves along a circumferential plane substantially parallel to and located between 22 mm and 82 mm from the equatorial plane of the tire.

10. The tire of claim 6, wherein the fourth ends of the long grooves are circumferentially aligned with the second ends of the short grooves along a circumferential plane substantially parallel to and located between 30 mm and 95 mm from the equatorial plane of the tire.

11. The tire of claim 1, wherein the transversal grooves of the second sequence are blind grooves.

12. The tire of claim 1, wherein the predetermined first distances are all equal.

13. The tire of claim 1, wherein the predetermined second distances are all equal.

14. The tire of claim 1, wherein the predetermined first distances are all equal, and wherein the predetermined second distances are all equal.

15. The tire of claim 1, wherein the predetermined first distances are all equal, wherein the predetermined second distances are all equal, and wherein the predetermined first distances equal the predetermined second distances.

16. The tire of claim 1, wherein the transversal grooves of the first sequence comprise a maximum depth between 5 mm and 10 mm, and herein the transversal grooves of the second sequence comprise a maximum depth between 5 mm and 10 mm.

17. The tire of claim 1, wherein the transversal grooves of the first sequence comprise a maximum width between 3.5 mm and 10 mm, and wherein the transversal grooves of the second sequence comprise a maximum width between 3.5 mm and 10 mm.

18. The tire of claim 1, wherein the transversal grooves of the first sequence are connected to the additional transversal grooves of respective shoulder zones by curving stretches, and wherein the curving stretches comprise a radius of curvature between 30 mm and 60 mm.

19. The tire of claim 1, wherein the additional transversal grooves comprise a stretch substantially perpendicular to the equatorial plane of the tire.

20. The tire of claim 1, wherein a value of a pitch of the transversal grooves of the first sequence is substantially twice a value of a pitch of the additional transversal grooves.

21. The tire of claim 1, wherein a value of a pitch of the transversal grooves of the second sequence is substantially twice a value of a pitch of the additional transversal grooves.

22. The tire of claim 1, wherein the additional transversal grooves comprise a maximum depth between 5 mm and 10 mm.

23. The tire of claim 1, wherein the additional transversal grooves comprise a maximum width between 3.5 mm and 10 mm.

24. The tire of claim 1, wherein a ratio of a width of each intermediate zone to a width of the tread band is between 0.17:1 and 0.30:1.

25. The tire of claim 1, wherein a ratio of a width of the central zone to a width of the tread band is between 0.10:1 and 0.20:1.

26. The tire of claim 1, wherein the two circumferential grooves delimit a central rib.

27. The tire of claim 1, wherein a portion of the tread band on a first side of the equatorial plane of the tire, when rotated by 180°, is an image of a portion of the tread band on a second side of the equatorial plane of the tire.

28. The tire of claim 1, wherein a portion of the tread band on a first side of the equatorial plane of the tire is a mirror image of a portion of the tread band on a second side of the equatorial plane of the tire.

29. The tire of claim 1, further comprising:
a longitudinal rib between each additional plane and a respective axially inner plane.

30. The tire of claim 29, wherein a width of the longitudinal rib is between 3 mm and 21 mm.

31. A tire for a wheel of a vehicle, comprising:
a casing structure;
a belt structure; and
a tread band;
wherein the casing structure comprises a central crown portion and two axially opposite sides terminating in ribs for attaching the tire to a corresponding rim of the wheel,
wherein the belt structure is coaxially associated with the casing structure,
wherein the tread band extends coaxially around the belt structure,
wherein the tread band comprises a pattern, comprising:
a central zone;
two intermediate zones; and
two shoulder zones;
wherein each of the zones extends between planes that are substantially parallel to an equatorial plane of the tire,
wherein the planes comprise two axially inner planes, two axially intermediate planes, and two axially outer planes,
wherein the axially outer planes correspond to side edges of the tread band,
wherein the central zone straddles the equatorial plane of the tire,
wherein the central zone extends between the two axially inner planes,
wherein each intermediate zone extends between one of the axially inner planes and a corresponding axially intermediate plane,
wherein each shoulder zone extends between one of the axially intermediate planes and a corresponding axially outer plane, wherein each intermediate zone comprises first and second sequences of pairs of transversal grooves, wherein the pairs of transversal grooves of the first sequence are consecutively alternated with the pairs of transversal grooves of the second sequence over a circumferential length of the tire, wherein each pair of transversal grooves of the first sequence comprises two distinct grooves at least partly parallel to each other, wherein each pair of transversal grooves of the second sequence comprises two distinct grooves at least partly parallel to each other, wherein the transversal grooves of the first sequence are inclined at a predetermined first angle relative to the transversal grooves of the second sequence, wherein the transversal grooves of the first sequence extend from first ends, at respective axially intermediate planes, to second ends, at predetermined first distances from selected transversal grooves of the second sequence, wherein the transversal grooves of the second sequence extend from third ends, at respective axially inner planes, to fourth ends, at predetermined second distances from selected transversal grooves of the first sequence, wherein each intermediate zone further comprises a circumferentially continuous, zigzag rib extending between respective axially inner and axially intermediate planes, wherein the shoulder zones comprise additional transversal grooves, and wherein a circumferential groove at each of the axially inner planes extends in a direction substantially parallel to the equatorial plane of the tire.

32. A premoulded tread band comprising a pattern, the pattern comprising:

a central zone;

two intermediate zones; and two shoulder zones;

wherein each of the zones extends between planes that are substantially parallel to an equatorial plane of the tire, wherein the planes comprise two axially inner planes, two axially intermediate planes, and two axially outer planes, wherein the axially outer planes correspond to side edges of the tread band, wherein the central zone straddles the equatorial plane of the tire, wherein the central zone extends between the two axially inner planes, wherein each intermediate zone extends between one of the axially inner planes and a corresponding axially intermediate plane, wherein each shoulder zone extends between one of the axially intermediate planes and a corresponding axially outer plane, wherein each intermediate zone comprises first and second sequences of pairs of transversal grooves, wherein the pairs of transversal grooves of the first sequence are consecutively alternated with the pairs of transversal grooves of the second sequence over a circumferential length of the tire, wherein each pair of transversal grooves of the first sequence comprises two distinct grooves at least partly parallel to each other, wherein each pair of transversal grooves of the second sequence comprises two distinct grooves at least partly parallel to each other, wherein the transversal grooves of the first sequence are inclined at a predetermined first angle relative to the transversal grooves of the second sequence, wherein the transversal grooves of the first sequence extend from first ends, at respective axially intermediate planes, to second ends, at predetermined first distances from selected transversal grooves of the second sequence, wherein the transversal grooves of the second sequence extend from third ends, at respective axially inner planes, to fourth ends, at predetermined second distances from selected transversal grooves of the first sequence, wherein each intermediate zone further comprises a circumferentially continuous, zigzag rib extending between respective axially inner and axially intermediate planes, wherein the shoulder zones comprise additional transversal grooves, and wherein a circumferential groove at each of the axially inner planes extends in a direction substantially parallel to the equatorial plane of the tire.

33. A premoulded tread band comprising a pattern, the pattern comprising:

a central zone;

two intermediate zones; and two shoulder zones;

wherein each of the zones extends between planes that are substantially parallel to an equatorial plane of the tire, wherein the planes comprise two axially inner planes, two axially intermediate planes, and two axially outer planes, wherein the axially outer planes correspond to side edges of the tread band, wherein the central zone straddles the equatorial plane of the tire, wherein the central zone extends between the two axially inner planes, wherein each intermediate zone extends between one of the axially inner planes and a corresponding axially intermediate plane, wherein each shoulder zone extends between one of the axially intermediate planes and a corresponding axially outer plane, wherein each intermediate zone comprises first and second sequences of pairs of transversal grooves, wherein the pairs of transversal grooves of the first sequence are consecutively alternated with the pairs of transversal grooves of the second sequence over a circumferential length of the tire, wherein each pair of transversal grooves of the first sequence comprises two distinct grooves at least partly parallel to each other, wherein each pair of transversal grooves of the second sequence comprises two distinct grooves at least partly parallel to each other, wherein the transversal grooves of the first sequence are inclined at a predetermined first angle relative to the transversal grooves of the second sequence, wherein the transversal grooves of the first sequence extend from first ends, at respective axially intermediate planes, to second ends, at predetermined first distances from selected transversal grooves of the second sequence, wherein the transversal grooves of the second sequence extend from third ends, at respective additional planes between the axially inner planes and the axially intermediate planes, to fourth ends, at predetermined second distances from selected transversal grooves of the first sequence, wherein the additional planes are substantially parallel to the equatorial plane of the tire, wherein each intermediate zone further comprises a circumferentially continuous, zigzag rib extending between respective axially inner and axially intermediate planes, wherein the shoulder zones comprise additional transversal grooves, and wherein a circumferential groove at each of the axially inner planes extends in a direction substantially parallel to the equatorial plane of the tire.

34. The tread band of claim 33, wherein the additional planes are located between 14 mm and 32 mm from the equatorial plane of the tire.

35. The tread band of claim 33, further comprising: a longitudinal rib between each additional plane and a respective axially inner plane.

36. The tread band of claim 35, wherein a width of the longitudinal rib is between 3 mm and 21 mm.

37. A tire for a wheel of a vehicle, comprising:
a casing structure;
a belt structure; and
a tread band;
wherein the casing structure comprises a central crown portion and two axially opposite sides terminating in ribs for attaching the tire to a corresponding rim of the wheel,
wherein the belt structure is coaxially associated with the casing structure,
wherein the tread band extends coaxially around the belt structure,
wherein the tread band comprises a pattern, comprising:
a central zone;
two intermediate zones; and
two shoulder zones;
wherein each of the zones extends between planes that are substantially parallel to an equatorial plane of the tire,
wherein the planes comprise two axially inner planes, two axially intermediate planes, and two axially outer planes,
wherein the axially outer planes correspond to side edges of the tread band,
wherein the central zone straddles the equatorial plane of the tire,
wherein the central zone extends between the two axially inner planes,
wherein each intermediate zone extends between one of the axially inner planes and a corresponding axially intermediate plane,
wherein each shoulder zone extends between one of the axially intermediate planes and a corresponding axially outer plane,
wherein each intermediate zone comprises first and second sequences of pairs of transversal grooves,
wherein the pairs of transversal grooves of the first sequence are consecutively alternated with the pairs of transversal grooves of the second sequence over a circumferential length of the tire,
wherein each pair of transversal grooves of the first sequence comprises two distinct grooves at least partly parallel to each other,
wherein each pair of transversal grooves of the second sequence comprises two distinct, straight grooves that are parallel to each other,
wherein the transversal grooves of the first sequence are inclined at a predetermined first angle relative to the transversal grooves of the second sequence,
wherein each pair of transversal grooves of the first sequence extends from first ends, at respective axially intermediate planes, to second ends, in a direction toward a respective transversal groove of the second sequence,
wherein each pair of transversal grooves of the second sequence extends from third ends, at respective axially inner planes, to fourth ends, in a direction toward a respective transversal groove of the first sequence,
wherein each intermediate zone further comprises a circumferentially continuous, zigzag rib extending between respective axially inner and axially intermediate planes,
wherein the shoulder zones comprise additional transversal grooves,
wherein the transversal grooves of the first sequence are connected to respective additional transversal grooves, and
wherein a circumferential groove at each of the axially inner planes extends in a direction substantially parallel to the equatorial plane of the tire.

38. A premoulded tread band comprising a pattern, the pattern comprising:
a central zone;
two intermediate zones; and
two shoulder zones;
wherein each of the zones extends between planes that are substantially parallel to an equatorial plane of the tire,
wherein the planes comprise two axially inner planes, two axially intermediate planes, and two axially outer planes,
wherein the axially outer planes correspond to side edges of the tread band,
wherein the central zone straddles the equatorial plane of the tire,
wherein the central zone extends between the two axially inner planes,
wherein each intermediate zone extends between one of the axially inner planes and a corresponding axially intermediate plane,
wherein each shoulder zone extends between one of the axially intermediate planes and a corresponding axially outer plane,
wherein each intermediate zone comprises first and second sequences of pairs of transversal grooves,
wherein the pairs of transversal grooves of the first sequence are consecutively alternated with the pairs of transversal grooves of the second sequence over a circumferential length of the tire,
wherein each pair of transversal grooves of the first sequence comprises two distinct grooves at least partly parallel to each other,
wherein each pair of transversal grooves of the second sequence comprises two distinct, straight grooves that are parallel to each other,
wherein the transversal grooves of the first sequence are inclined at a predetermined first angle relative to the transversal grooves of the second sequence,
wherein each pair of transversal grooves of the first sequence extends from first ends, at respective axially intermediate planes, to second ends, in a direction toward a respective transversal groove of the second sequence, wherein each pair of transversal grooves of the second sequence extends from third ends, at respective axially inner planes, to fourth ends, in a direction toward a respective transversal groove of the first sequence, wherein each intermediate zone further comprises a circumferentially continuous, zigzag rib extending between respective axially inner and axially intermediate planes, wherein the shoulder zones comprise additional transversal grooves, wherein the transversal grooves of the first sequence are connected to respective additional transversal grooves, and wherein a circumferential groove at each of the axially inner planes extends in a direction substantially parallel to the equatorial plane of the tire.

* * * * *

UNITED STATES PATENT AND TRADEMARK OFFICE
CERTIFICATE OF CORRECTION

PATENT NO. : 7,131,475 B2
APPLICATION NO. : 10/148597
DATED : November 7, 2006
INVENTOR(S) : Renato Caretta et al.

It is certified that error appears in the above-identified patent and that said Letters Patent is hereby corrected as shown below:

Title page, item (30), "M199A2516" should read --MI99A002516--.

Claim 16, column 13, line 50, "herein" should read --wherein--.

Signed and Sealed this

Thirteenth Day of March, 2007

JON W. DUDAS
*Director of the United States Patent and Trademark Office*